United States Patent
Ikeda et al.

(10) Patent No.: US 8,648,895 B2
(45) Date of Patent: Feb. 11, 2014

(54) METHOD AND APPARATUS FOR PERFORMING THREE-DIMENSIONAL MEASUREMENT

(75) Inventors: Yasuyuki Ikeda, Ikeda (JP); Shiro Fujieda, Kyoto (JP); Hiroshi Yano, Toyonaka (JP)

(73) Assignee: Omron Corporation, Kyoto (JP)

( * ) Notice: Subject to any disclaimer, the term of this patent is extended or adjusted under 35 U.S.C. 154(b) by 884 days.

(21) Appl. No.: 12/230,441

(22) Filed: Aug. 28, 2008

(65) Prior Publication Data

US 2009/0066968 A1 Mar. 12, 2009

(30) Foreign Application Priority Data

Aug. 29, 2007 (JP) ................................ P2007-222168

(51) Int. Cl.
*H04N 13/00* (2006.01)
*G01C 9/00* (2006.01)

(52) U.S. Cl.
USPC ......... 348/42; 348/86; 348/E13.016; 702/150

(58) Field of Classification Search
None
See application file for complete search history.

(56) References Cited

U.S. PATENT DOCUMENTS

2005/0237385 A1* 10/2005 Kosaka et al. ................. 348/42

FOREIGN PATENT DOCUMENTS

| JP | 2004-234423 | | 8/2004 |
|----|-------------|---|--------|
| JP | 2004-354256 | A | 12/2004 |

* cited by examiner

*Primary Examiner* — Wen-Tai Lin
(74) *Attorney, Agent, or Firm* — Foley & Lardner LLP

(57) ABSTRACT

A control processing unit simultaneously drives cameras to produce images of a measuring object, the control processing unit searches corresponding point on a comparative image produced by one of the cameras for a representative point in a reference image produced by the other camera, and the control processing unit computes a three-dimensional coordinate corresponding to a coordinate using the coordinate of each point correlated by the search. The control processing unit also obtains a shift amount at the corresponding point specified by the search to an epipolar line specified based on a coordinate of a representative point on the reference image side or a parameter indicating a relationship between the cameras, and the control processing unit supplies the shift amount as an evaluation value indicating accuracy of three-dimensional measurement along with three-dimensional measurement result.

4 Claims, 6 Drawing Sheets

1
METHOD AND APPARATUS FOR PERFORMING THREE-DIMENSIONAL MEASUREMENT

This application claims priority from Japanese patent application P2007-222168, filed on Aug. 29, 2007. The entire content of the aforementioned application is incorporated herein by reference.

BACKGROUND OF THE INVENTION

1. Field of the Invention

The present invention relates to a method and an apparatus for measuring three-dimensional measurement using plural cameras which are disposed while a positional relationship and optical axis directions are fixed such that visual fields of the cameras overlap within a predetermined range.

2. Description of the Related Art

In this kind of three-dimensional measurement processing, generally two cameras are used, a three-dimensional coordinate is computed for feature points which appear commonly in images produced by both the cameras based on a triangulation principle. In order to specify the feature point which becomes a measurement target, one of the images is set at a reference image, a representative point included in the measuring object is extracted from the reference image, and processing (for example, pattern matching) for searching a corresponding point in the other image is performed using an image within a region having a predetermined size including the representative point. In computing the three-dimensional coordinate, computation is performed using parameters previously set by calibration.

In the corresponding point search processing, in order to efficiently and accurately perform the search, there is widely adopted a method, in which an epipolar line is specified on a search target image based on a coordinate of the representative point in the reference image or a positional relationship between the cameras and a region corresponding to the region including the feature point is searched along the epipolar line (refer to, for example, Japanese Patent Application Laid-Open No. 2004-234423).

In the three-dimensional measurement processing, it is necessary that a relative positional relationship and optical axis directions of the cameras be fixed with respect to the measurement target region. However, sometimes a position or an attitude of the camera is changed from any cause. In such cases, because the point corresponding to the feature point on the reference image side is shifted from the proper position, three-dimensional coordinate computation result also becomes incorrect.

When the three-dimensional measurement result becomes incorrect due to the change in position or attitude of the camera, a fatal damage is possibly generated in the case where the exact measurement result is required.

For example, in the case where a robot hand is positioned by the three-dimensional measurement in an assembly line of a plant, when processing advances without noticing the incorrect measurement result, possibly a defective is generated or a processing error is generated. In the case where inspection is performed by the three-dimensional measurement, the defective is overlooked and delivered, or there is a risk of increasing the number of products which are determined as the defective although they are a non-defective item.

In view of the above-described problem, an object of the present invention is to provide a method and an apparatus for measuring three-dimensional measurement, in which a user can quickly notice and deal with the incorrect three-dimensional measurement result because the relationship between the cameras differs from that of the initial setting state.

SUMMARY OF THE INVENTION

In a three-dimensional measurement method of the present invention, plural cameras are disposed while a positional relationship and optical axis directions are fixed such that visual fields of the cameras overlap within a predetermined range, particular one camera of the plural cameras is set at a reference camera, and three-dimensional measurement is performed to a measuring object by performing a first step, a second step, a third step, and a fourth step predetermined times, the measuring object entering a range where visual fields of the plural cameras overlap being taken by the cameras in the first step, a representative point of the measuring object being extracted from a reference image produced by the reference camera in the second step, a point corresponding to the representative point on the reference image side being searched in an image produced by a camera except for the reference camera in the third step, a three-dimensional coordinate corresponding to a coordinate being obtained using the coordinate of each point correlated by the search of the third step in the fourth step.

In the third step, desirably the search is performed along the epipolar line in order to efficiently perform the search. In such cases, it is necessary that the search target cover a range away from the epipolar line to some extent so as to be able to deal with the case in which the corresponding point is shifted from the epipolar line.

When the relationship between the cameras differs from that specified by calibration prior to the measurement processing because a position or an attitude of the camera is changed, the corresponding point of the other image to the representative point extracted from the reference image is located at a position distant from the epipolar line based on the relationship between the cameras specified by the calibration.

In the invention, attention is focused on this point, while three-dimensional measurement processing is performed to one measuring object, a shift amount at the corresponding point obtained by the search of the third step to an epipolar line based on a predetermined relationship between the camera and the coordinate of the representative point in the reference image is computed for at least one representative point, evaluation information indicating accuracy of three-dimensional measurement result is set based on the computed shift amount, and the evaluation information is supplied along with the three-dimensional measurement result of the measuring object.

According to the method, while the three-dimensional measurement processing is performed to one measuring object, the evaluation information indicating the accuracy of measurement result is obtained, and the evaluation information is supplied along with the three-dimensional measurement result. Therefore, when the accuracy of three-dimensional measurement is lowered due to the change in relationship between the cameras, the user is prevented from overlooking the lowering of the accuracy of three-dimensional measurement.

Desirably the processing for obtaining the shift amount at the corresponding point and the output of the evaluation information are performed to all the measuring objects. Alternatively, the processing for obtaining the shift amount at the corresponding point and the output of the evaluation information may be performed every time not less than two measuring objects are processed.

The output destination of the evaluation information is not limited to a display device and an external device, but the evaluation information may be supplied to a memory device or a drive apparatus for removable storage medium.

Japanese Patent Application Laid-Open No. 2004-234423 discloses a technique of obtaining a degree of reliability of three-dimensional measurement processing while the three-dimensional measurement processing is performed. However, the degree of reliability in Japanese Patent Application Laid-Open No. 2004-234423 is used to determine whether or not a point different from the true corresponding point is falsely extracted while the corresponding point is searched along the epipolar line.

The evaluation information of the present invention is used to recognize a state in which the parameter necessary to compute the three-dimensional coordinate does not correspond to the actual dispositions of the cameras although the corresponding point of itself is correct. Therefore, the evaluation information of the present invention differs thoroughly from the degree of reliability in Japanese Patent Application Laid-Open No. 2004-234423 in the concept. In Japanese Patent Application Laid-Open No. 2004-234423, while a scanning window is scanned along the epipolar line in a checking target image, the degree of reliability is computed by the operation in which the sum of absolute value (SAD) of a brightness difference with the reference window is used in each scanning position, and there is no description in that the shift amount at the corresponding point is obtained to the epipolar line.

When the positions or attitudes of the reference camera and the camera except for the reference camera are similarly changed, a phenomenon the corresponding point on the reference image side to the representative point is shifted from the epipolar line is not generated because the relative relationship between the cameras is not changed. However, the accuracy of three-dimensional measurement is lowered, because a relationship between a stereo coordinate system of the cameras and the space coordinate system specifying the three-dimensional coordinate is changed.

Further, in the three-dimensional measurement method of the invention, not less than three cameras are used, the cameras expect for the reference camera are individually combined with the reference camera, the second, third, and fourth steps and the shift amount computation processing are performed in each combination, and the evaluation information is supplied based on the largest shift amount.

According to the configuration, even if one of the cameras except for the reference camera and the reference camera are moved while the relationship between the two is maintained, the shift amount associated with the combination of the reference camera and the other camera which is correctly disposed becomes larger, so that the lowering of the accuracy of three-dimensional measurement can be detected.

A three-dimensional measurement apparatus of the present invention includes an image input unit into which an image of a measuring object entering a range where visual fields of plural cameras overlap is individually fed from the plural cameras, the plural cameras being disposed while a positional relationship and optical axis directions are fixed such that the visual fields of the cameras overlap within a predetermined range; a representative point extraction unit which extracts a representative point of the measuring object from a reference image produced by a reference camera while particular one camera of the plural cameras is set at the reference camera; a corresponding point search unit which searches a point corresponding to the representative point on the reference image side in an image produced by a camera except for the reference camera; a three-dimensional coordinate computation unit which obtains a three-dimensional coordinate corresponding to a coordinate using the coordinate of each point correlated by the search processing of the corresponding point search unit; and an output unit which supplies three-dimensional measurement result information based on the three-dimensional coordinates computed for predetermined representative points extracted by the representative point extraction unit.

The three-dimensional measurement apparatus further includes a shift amount computation unit which computes a shift amount at the corresponding point obtained by the search of the corresponding point search unit to an epipolar line based on a predetermined relationship between the camera and the coordinate of the representative point in the reference image is computed for at least one representative point while three-dimensional measurement processing is performed to one measuring object. The output unit sets evaluation information indicating accuracy of three-dimensional measurement result based on the shift amount computed by the shift amount computation unit and supplies the evaluation information along with the three-dimensional measurement result of the measuring object.

According to the configuration, the basic processing of the three-dimensional measurement method is performed. Therefore, the user is caused to notify that the accuracy of three-dimensional measurement result is lowered, and the user can quickly deal with the abnormality.

Further, in the three-dimensional measurement apparatus of the invention, images are fed into the image input unit from not less than three cameras, in the corresponding point search unit, the three-dimensional coordinate computation unit, and the shift amount computation unit, the cameras except for the reference camera are individually combined with the reference camera, and processing is performed in each combination.

Further, the output unit produces and supplies the evaluation information based on a maximum value of the shift amounts computed in the combinations of the cameras.

According to the configuration, even if the reference camera and one of the cameras are similarly moved, the evaluation information indicating that the accuracy of three-dimensional measurement is lowered can be supplied.

Further, in the three-dimensional measurement apparatus of the invention, the three-dimensional measurement apparatus further includes a notification unit which makes a notification for warning, when the shift amount used to produce the evaluation information exceeds a predetermined permissible value, or when a degree of reliability of the three-dimensional measurement result indicated by the evaluation information is lower than a predetermined reference value. According to the configuration, the warning causes the user to recognize that the accuracy of three-dimensional measurement becomes impermissible, so that the use of the measurement result having poor accuracy can be prevented.

In the three-dimensional measurement method and the three-dimensional measurement apparatus, the evaluation information indicating the degree of reliability of the measurement processing is supplied in synchronization with the output of the three-dimensional measurement result, so that the use of the three-dimensional measurement result having poor accuracy can be prevented.

DETAILED DESCRIPTION OF THE PREFERRED EMBODIMENTS

Figure 1:
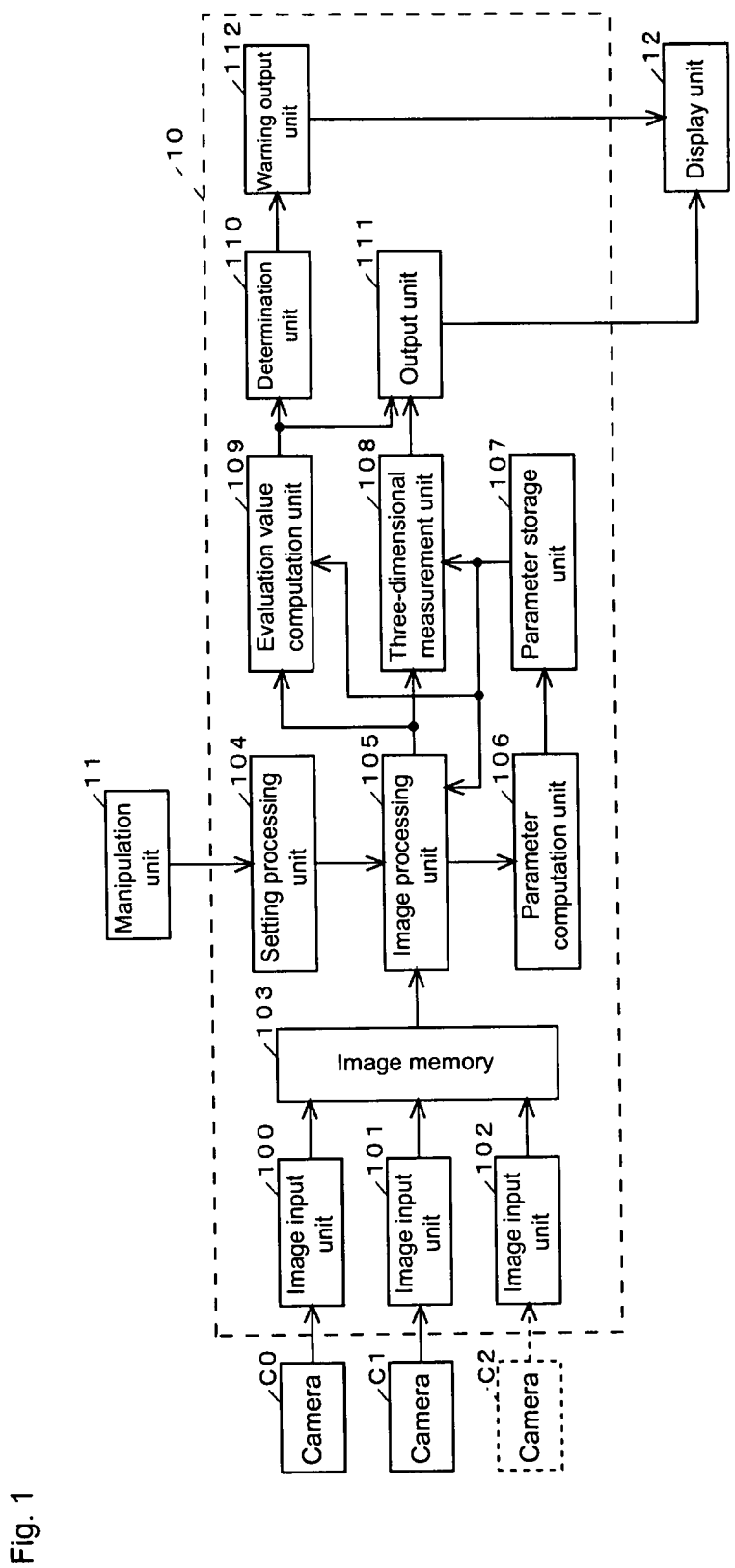
FIG. 1 shows a functional block diagram of a configuration of a three-dimensional measurement.

FIG. 1 shows a three-dimensional measurement apparatus according to an embodiment of the invention.

In a production line of a plant, the three-dimensional measurement apparatus sequentially delivers measuring objects having the same shape to a processing target region to perform the three-dimensional measurement using two or three cameras.

Referring to FIG. 1, a computer is incorporated in a control processing unit 10. Cameras C0, C1, and C2, a manipulation unit 11, and a display unit 12 are connected to the control processing unit 10. Because the third camera C2 can be connected if needed in the cameras C0, C1, and C2, a frame of the camera C2 is indicated by a broken line.

The control processing unit 10 includes image input units 100, 101, and 102 which correspond to the cameras C0, C1, and C2, an image memory 103, a setting processing unit 104, an image processing unit 105, a parameter computation unit 106, a parameter storage unit 107, a three-dimensional measurement unit 108, an evaluation value computation unit 109, a determination unit 110, an output unit 111, and a warning output unit 112. The units except for the image input units 100 to 102, the image memory 103, and the parameter storage unit 107 are functions set in a computer by a dedicated program. The dedicated program is stored in a large-capacity memory device (not shown) such as a hard disk and a flash disk. The image memory 103 and the parameter storage unit 107 are also set in the memory device.

In the embodiment, the camera C0 is disposed such that an optical axis is orientated toward a vertical direction to take an image of a measuring object from directly above, and the cameras C1 and C2 are disposed so as to take the image of the measuring object from obliquely above. In each camera, a displacement position and an optical axis direction are adjusted such that a visual field of the camera includes a whole processing target region where the measuring object is placed. The camera C0 is set at a reference camera, and the cameras C1 and C2 are individually combined with the reference camera C0. The three-dimensional measurement is performed in each combination.

The image processing unit 105 extracts a representative point (such as an edge constituting point and a barycenter of a region having a certain feature) of the measuring object for the image fed from the reference camera C0 by a technique such as binarization, edge extraction, and pattern matching. The image processing unit 105 performs processing for searching a point corresponding to a representative point in the reference image A0 for the images (hereinafter referred to as "comparative image") fed from the cameras C1 and C2.

The setting processing unit 104 accepts a manipulation for setting specific contents (such as a method for extracting the representative point and an extraction processing target range) which should be performed by the image processing unit 105 from the manipulation unit 11, and the setting processing unit 104 sets the specific contents in the image processing unit 105.

The three-dimensional measurement unit 108 computes a three-dimensional coordinate using a coordinate of the representative point in the reference image A0 extracted by the image processing unit 105 and coordinates of the corresponding representative points on the sides of the comparative images A1 and A2. The computation result is delivered to the output unit 111 and displayed on the display unit 12 or an external device (not shown).

Plural parameters used in three-dimensional measurement processing are stored in the parameter storage unit 107. The parameters are specified prior to main processing by calibration in which calibration work having plural feature points is used. Examples of the parameters include a parameter constituting a coefficient of a computing equation for computing the three-dimensional coordinate and a parameter for specifying an epipolar line.

The various parameters vary depending on a change in stereo coordinate system formed by the cameras and a change in relationship between the stereo coordinate system and a space coordinate system expressing a position in an actual space (a distance between origins of the coordinate systems and a rotational shift amount of the stereo coordinate system to the space coordinate system). Accordingly, in the case where a position or an attitude of the camera is changed, accuracy of the three-dimensional measurement cannot be ensured unless the calibration is performed to compute the parameters again.

In the embodiment, because the three-dimensional measurement is performed while the cameras C1 and C2 are individually combined with the reference camera C0, it is necessary that parameters be computed in each combination.

Figure 2:
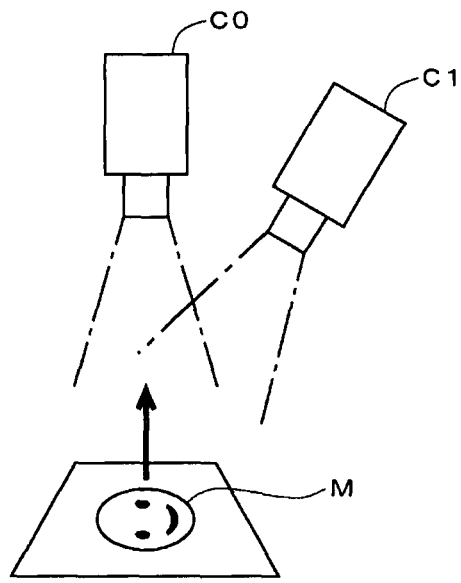
FIG. 2 shows an explanatory view of a placement example of two cameras.

FIG. 2 shows an example in which the cameras are placed in the case of the use of the cameras C0 and C1. In the embodiment, a face mark M is schematically shown as the measuring object.

In the embodiment, the measuring objects are sequentially delivered to a processing target region having a predetermined space to perform the three-dimensional measurement. The reference camera C0 is disposed directly above the processing target region such that the optical axis of the reference camera C0 is orientated toward the vertical direction, the reference camera C0 produces an image (front face image) indicating a state in which a top of the measuring object is viewed from the front face. On the other hand, the camera C1 which produces the comparative image is disposed so as to take the image of the processing target region from obliquely above.

Figure 3:
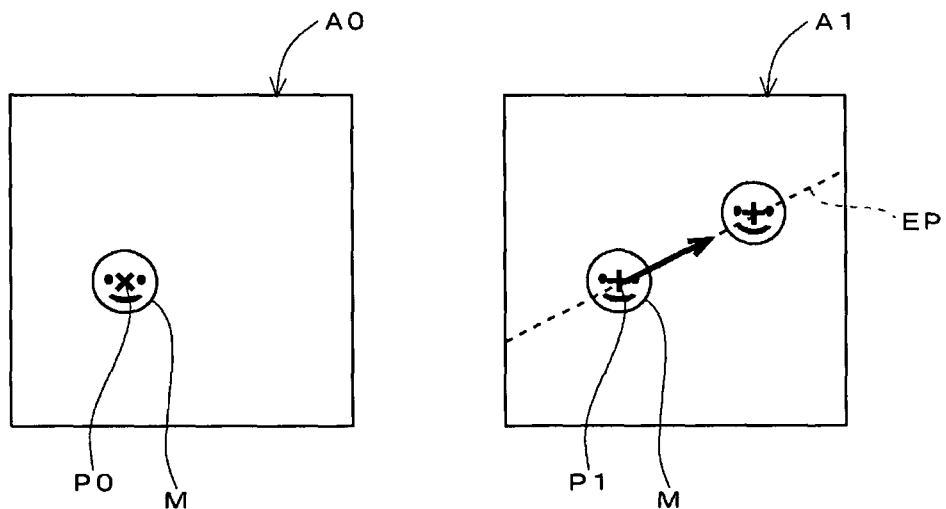
FIG. 3 shows a view explaining how a change in height of a mark M is reflected on images A0 and A1 produced by the cameras of FIG. 2.

FIG. 3 shows how a change in height of the mark M shown in FIG. 2 is reflected on the reference image A0 produced by the camera C0 and the comparative image A1 produced by the camera C1. For the sake of convenience, marks in the images A0 and A1 are also designated by the letter M.

Assuming that a center point P0 of the mark M in the image is set to the representative point, because the reference image A0 is the front face image of the mark M, a coordinate of the representative point P0 is kept constant even if the actual height is changed. On the other hand, in the comparative image A1 produced by the camera C1, when the height of the actual mark M is changed, the representative point P1 in the image is moved along a certain straight line EP. The straight line EP is the epipolar line of the representative point.

In the case where the positions or attitudes of the cameras C0 and C1 are maintained like the calibration state, the epipolar line EP can accurately be obtained based on the coordinate of the representative point P0 on the side of the reference image A0 and the parameters stored in the parameter storage unit 107.

Figure 4:
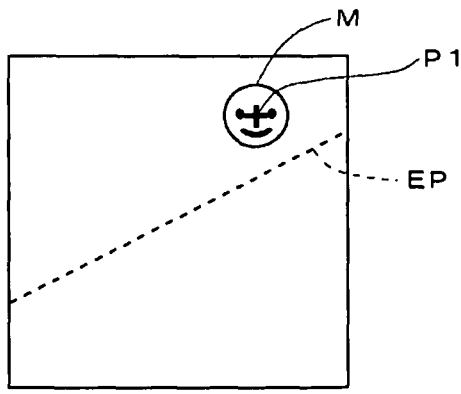
FIG. 4 shows an explanatory view of an example in which a mark M is located away from an epipolar line in a comparative image A1.

In the case of the change in position or attitude of the camera C1, when a user takes the image without noticing the change in position or attitude of the camera C1, the actual epipolar line becomes a straight line that is different from the epipolar line EP shown in FIG. 3, and the, correct epipolar line EP cannot be specified by the storage parameters. Therefore, as shown in FIG. 4, the representative point P1 in the comparative image A1 is shifted from the epipolar line EP.

In the case of the change in position or attitude of the camera C0, because the camera C1 is not moved, the mark M in the comparative image A1 appears on the straight line EP like the example of FIG. 3. However, because the position of the representative point P0 on the side of the reference image A0 is changed by the movement of the camera C0, the epipolar line specified by the changed coordinate is different from the example of FIG. 3. Therefore, the representative point P1 in the comparative image A1 is also shifted from the epipolar line which is specified by the representative point P0 of the reference image A0 or the registered parameters.

When the camera C0 or C1 is moved to vary the relationship between the cameras, the representative point P1 on the side of the comparative image A1 appears at a position distant from the epipolar line EP which is specified by the representative point P0 of the reference image A0 or the registered parameters. With this in mind, in the embodiment, when the corresponding point P1 for the representative point P0 in the reference image A0 is searched, it is assumed that the search target range covers a range distant from the epipolar line EP by a predetermined distance based on the theoretical epipolar line EP derived from the coordinate of the representative point P0 or various parameters. On the other hand, the evaluation value computation unit 109 computes an evaluation value indicating evaluation of the accuracy of three-dimensional measurement. The evaluation value is set such that the value is increased as the accuracy of the three-dimensional measurement is deteriorated.

The output unit 111 supplies the evaluation value along with the three-dimensional measurement result, and the evaluation value is fed into the determination unit 110.

The determination unit 110 compares the evaluation value to a predetermined permissible value. When the evaluation value exceeding the permissible value is detected, the warning output unit 112 is activated. The warning output unit 112 produces message information indicating that a level of reliability of the three-dimensional measurement result is significantly lowered for the user, and the warning output unit 112 supplies the message information to the display unit 12 (hereinafter the processing performed by the warning output unit 112 is referred to as "warning output").

Although not clearly shown in FIG. 1, traceability information in which the three-dimensional measurement result and evaluation value of each measuring object are correlated to an identification code of the measuring object or date and time when the processing is performed is produced and stored in the internal memory of the control processing unit 10. Therefore, even if the user overlooks the output of the evaluation value or the warning output to perform the measurement processing although the accuracy of three-dimensional measurement is lowered, the measuring object in which flaws exist in the processing result can be specified by checking the traceability information at a later date.

The three-dimensional measurement processing and the evaluation value computation processing will be described in detail with reference to a flowchart of FIG. 5.

Figure 5:
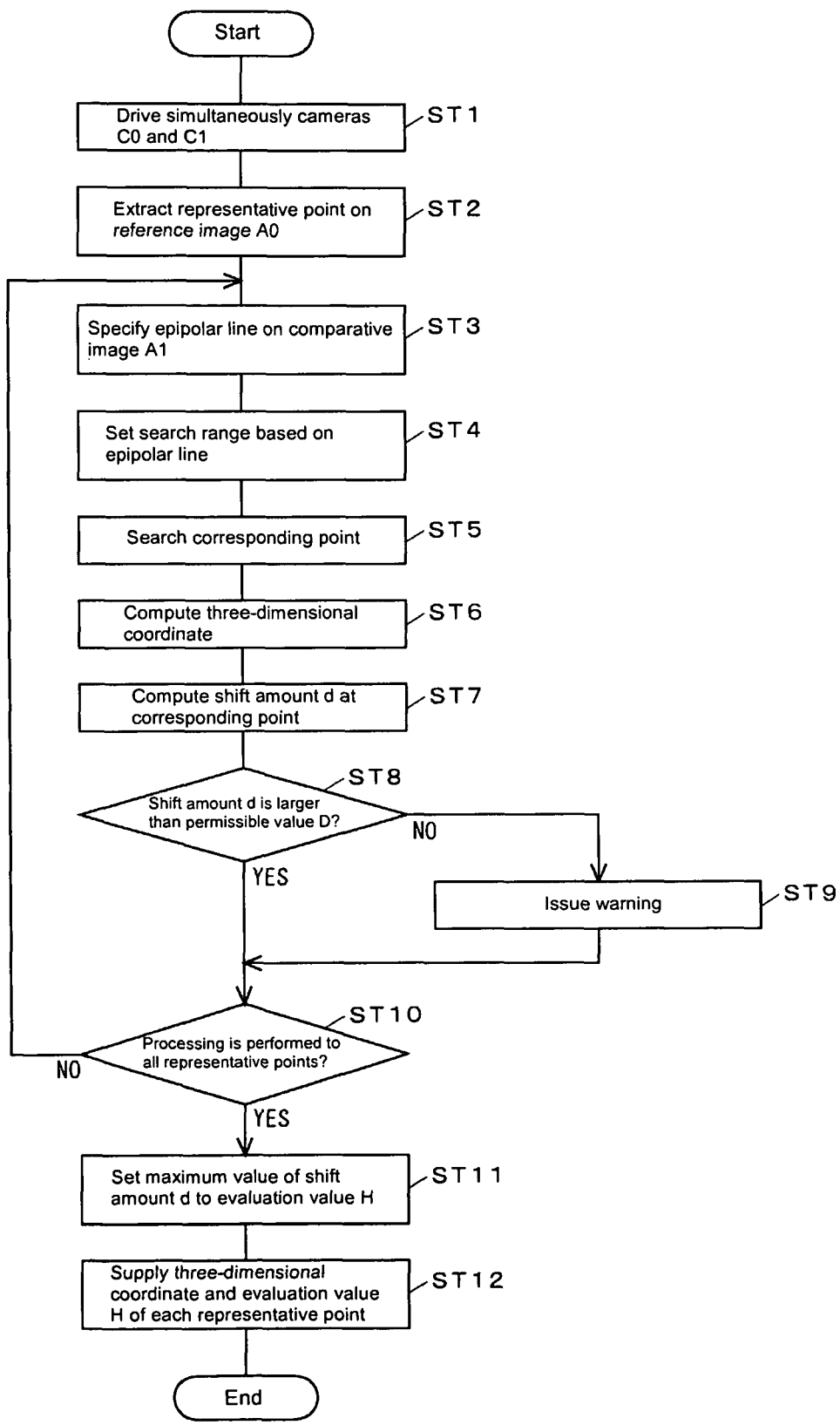
FIG. 5 shows a flowchart of an example of three-dimensional measurement processing.

In the example of FIG. 5, it is assumed that the three-dimensional measurement is performed to plural measurement target regions of each measuring object. However, sometimes only one representative point is measured. The same holds true for examples of FIGS. 7 and 8.

In ST1 ("step" is abbreviated to ST), the cameras C0 and C1 are simultaneously driven in response to the delivery of the measuring object to the processing target region. Therefore, the camera C0 produces the reference image A0 indicating a state in which the measuring object is viewed from the front face, and the camera C1 produces the comparative image A1 indicating a state in which the measuring object is viewed from obliquely above. The reference image A0 and the comparative image A1 are stored in the image memory 103.

In ST2, predetermined representative points are extracted from the reference image A0 by previously-set image processing. Then, attention is sequentially focused on the extracted representative points to perform pieces of processing in ST3 to ST9.

In ST3, for the focused representative point, the epipolar line is specified on the comparative image A1 based on the coordinate on the side of the reference image A0. In ST4, a belt-shape region having a predetermined width is set such that the epipolar line becomes the center line, and the belt-shape region is set to the corresponding point search range.

In ST5, processing for searching a point corresponding to the focused representative point is performed in the search range. Specifically, a local region having a predetermined size is set in the reference image A0 while the focused representative point is centered, and the image within the local region is cut out as a model image. Then, the model image is sequentially matched with an inspection region on the side of the comparative image A1 while the inspection region is scanned, and the region having the highest similarity to the model image is specified. The coordinate of the center point of the specified region is detected, and the coordinate is set to the coordinate of the point corresponding to the focused representative point.

Thus, the point corresponding to the focused representative point is specified. In ST6, using the coordinate of the representative point on the side of the reference image A0 and the coordinate of the corresponding point on the side of the comparative image A1, the three-dimensional coordinate corresponding to these coordinates is computed.

Figure 6:
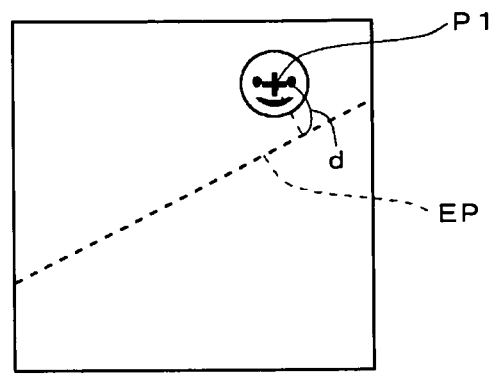
FIG. 6 shows an explanatory view of a concept of a shift amount.

In ST7, a shift amount d from the epipolar line specified in ST3 is computed for the corresponding point (corresponding to P1 of FIGS. 3 and 4) specified by search processing in ST5. As shown in FIG. 6, the shift amount d is obtained as a distance from the epipolar line EP to the representative point P1.

In ST8, the computed shift amount d is compared to a predetermined permissible value D. When the shift amount d exceeds the permissible value D, the flow goes to ST9, and a warning is issued. The shift amount d is not more than the permissible value D, ST9 is skipped. Irrespective of the determination result in ST8, the value of the shift amount d is tentatively stored in a working memory every time.

Although the permissible value D is set by default, the permissible value D may appropriately be changed by user setting manipulation.

When the pieces of processing in ST3 to ST9 are performed to all the representative points extracted in ST2, an affirmative determination is made in ST10, and the flow goes to ST11. In ST11, a maximum value is extracted from the shift amounts d computed for the representative points, and the maximum value of the shift amount d is set to an evaluation value H.

In ST12, the three-dimensional coordinate of each representative point obtained in ST6 every time and the evaluation value H set in ST11 are supplied. As described above, the output is performed in the three modes of the display, external output, and storage in the memory.

In the above-described pieces of processing, the user can confirm whether or not the accuracy of three-dimensional measurement is lowered by the supplied evaluation value H. The maximum value of the shift amounts d at the points corresponding to the representative points to the epipolar line is supplied as the evaluation value H, so that the result in which the accuracy of three-dimensional measurement is evaluated most severely can be supplied. When the shift amount d exceeding the permissible value D is computed while the measurement processing is performed, the warning is immediately issued. Therefore, when one of the cameras C0 and C1 is largely moved to remarkably lower the accuracy of three-dimensional measurement, the user can rapidly recognize the lowering of the accuracy of three-dimensional measurement.

In the example of FIG. 5, the maximum value of the shift amounts d computed for the plural representative points is supplied as the evaluation value H. However, the output form is not limited to the embodiment. For example, an average or a fluctuation width (difference between the maximum value and the minimum value) of the shift amounts d at the plural representative points may be supplied. The shift amount d computed in each representative point may directly be supplied as the evaluation value while correlated with the three-dimensional coordinate. While the three-dimensional coordinates are sequentially computed for the plural representative points, the shift amount d is obtained only for particular one representative point, and the shift amount d may be supplied as the evaluation value.

In the example of FIG. 5, the evaluation value indicating the accuracy of three-dimensional coordinate can easily be obtained by utilizing a principle, in which the epipolar line based on the registered parameters becomes incorrect to separate the corresponding point of the comparative image A1 from the epipolar line when the relationship between the cameras C0 and C1 varies.

On the other hand, when the cameras C0 and C1 are similarly moved while the relative relationship between the cameras C0 and C1 is maintained (for example, the cameras C0 and C1 are moved in parallel by the same distance or the cameras C0 and C1 are rotated by the same angle), the epipolar line apparently becomes normal (in other words, the coordinate of the representative point of the reference image A0 and the corresponding point on the epipolar line EP based on the registered parameters can be found). However, at this point, because the relationship between the stereo coordinate system and the space coordinate system becomes faulty, the coordinates of the representative points P0 and P1 in the images A0 and A1 do not express the positions which should be located, and the three-dimensional coordinate cannot correctly be computed.

Thus, even if the positions or attitudes of the two cameras are similarly changed, the accuracy of three-dimensional measurement is lowered. However, because the corresponding point on the comparative image is located on the epipolar line, the lowering of the measurement accuracy cannot be recognized by the evaluation value H obtained from the shift amount d at the corresponding point.

Figure 7:
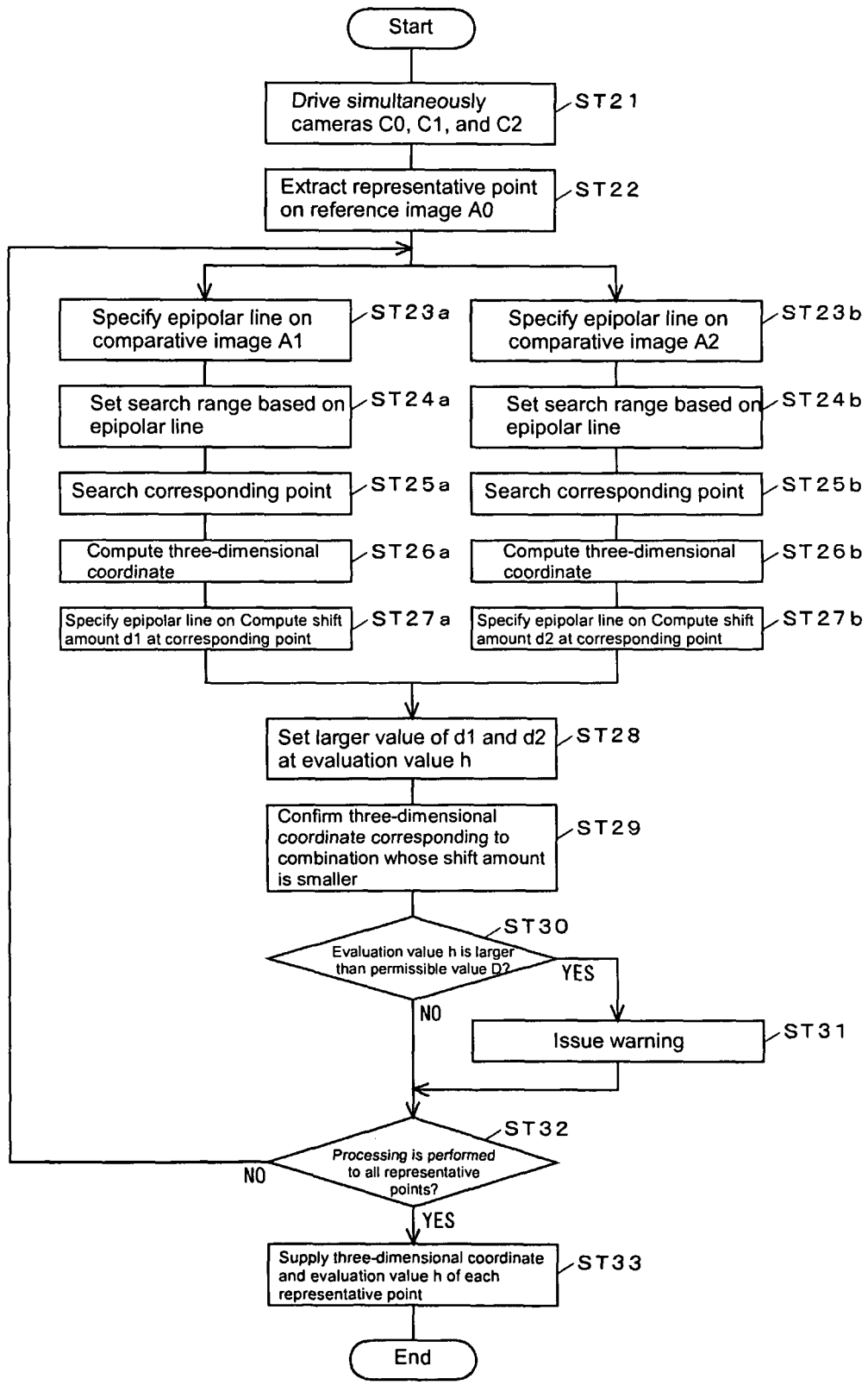
FIG. 7 shows a flowchart of another example of the three-dimensional measurement processing.

In order to solve the problem, in an example shown in FIG. 7, three cameras are connected to the control processing unit 10, the cameras C1 and C2 which take the images from obliquely above are individually combined with the reference camera C0, the three-dimensional coordinate or the evaluation value is computed in each combination.

In FIG. 7, the cameras C0, C1, and C2 are simultaneously driven in response to the delivery of the measuring object to the processing target region (ST21), and the representative point extraction processing is performed to the reference image A0 produced by the camera C0 (ST22).

While attention is sequentially focused on the representative points, processing for specifying the epipolar line (ST23a and ST23b), processing for setting the search range based on the epipolar line (ST24a and ST24b), processing for searching the corresponding point (ST25a and ST25b), processing for computing the three-dimensional coordinate (ST26a and ST26b), and processing for computing the shift amount at the corresponding point to the epipolar line (ST27a and ST27b) are concurrently performed for the comparative image A1 produced by the camera C1 and the comparative image A2 produced by the camera C2. The pieces of processing are similar to those in ST3 to ST7 of FIG. 5, the detailed description is not given.

Thus, the three-dimensional coordinate and the shift amount are individually computed for the comparative images A1 and A2 (for the sake of convenience, hereinafter it is assumed that d1 is a shift amount corresponding to the comparative image A1 and d2 is a shift amount corresponding to the comparative image A2). In ST28, the shift amounts d1 and d2 are compared to each other, and the larger shift amount is set to an evaluation value h. In ST29, in the three-dimensional coordinates obtained in each combination of the cameras, the three-dimensional coordinate corresponding to a combination having the smaller shift amount is fixed as the measurement result.

When the evaluation value h exceeds the permissible value D, the flow goes to ST31 from ST30, and the warning is issued.

When the above-described pieces of processing are performed to all the representative points, an affirmative determination is made in ST32, the flow goes to ST33, the three-dimensional coordinate fixed in ST 29 and the evaluation value h set in ST 28 are combined and supplied in each representative point.

For example, the reference camera C0 and the camera C1 are moved while the relative relationship is maintained, and a small shift amount is generated at the corresponding point on the comparative image A1. Even in this case, a phenomenon in which the corresponding point is shifted from the epipolar line is generated in the comparative image A2 produced by the remaining camera C2 which is normally placed.

In the embodiment, the cameras C1 and C2 are individually combined with the reference camera C0, the three-dimensional coordinate and the shift amount at the corresponding point are computed in each combination, and the larger shift amount is used as the evaluation value. Therefore, the user can easily recognize the lowering of the accuracy of three-dimensional measurement by the evaluation value.

The reason why the three-dimensional coordinate having the smaller shift amount is used as the three-dimensional measurement result is described as follows. The result in which one of the shift amounts d1 and d2 becomes smaller while the other becomes larger is obtained in the case where the relationship between the cameras associated with one of the combinations is changed while the relationship between the cameras associated with the other combination is kept normal, in addition to the case in which the relationship among all the cameras becomes faulty due to the movement of the reference camera C0. In such cases, the shift amount corresponding to the normal relationship becomes smaller, so that the accuracy of three-dimensional measurement can be maintained by adopting the three-dimensional coordinate having the smaller shift amount.

For example, when only the camera C1 in the cameras C0 to C2 is moved, because the relationship between the cameras C0 and C1 is changed, the accuracy of three-dimensional measurement associated with the combination of the cameras C0 and C1 is lowered to increase the shift amount d1. On the other hand, the cameras C0 and C2 are correctly disposed, the three-dimensional measurement result associated with the combination of the cameras C0 and C2 is correct and the shift amount d2 is also decreased. In such cases, according to the pieces of processing of FIG. 7, the shift amount d1 associated with the combination of the cameras C0 and C1 whose relationship becomes faulty is supplied as the evaluation value h, and the correct three-dimensional coordinate associated with the combination of the cameras C0 and C2 is also supplied while fixed as the three-dimensional measurement result. Therefore, even if the supplied three-dimensional measurement result is used, no trouble is generated.

However, in the case where one of the shift amounts d1 and d2 is close to zero while the other has a large value, a determination whether or not the cameras associated with the combination having the smaller shift amount are correctly disposed cannot be made based only on the phenomenon. In the embodiment, the larger value of the shift amounts d1 and d2 is always used as the evaluation value h, and the warning is issued when the evaluation value h exceeds the permissible value D. Therefore, even if the camera disposition having the smaller shift amount becomes faulty, the abnormality can be prevented from being overlooked.

Figure 8:
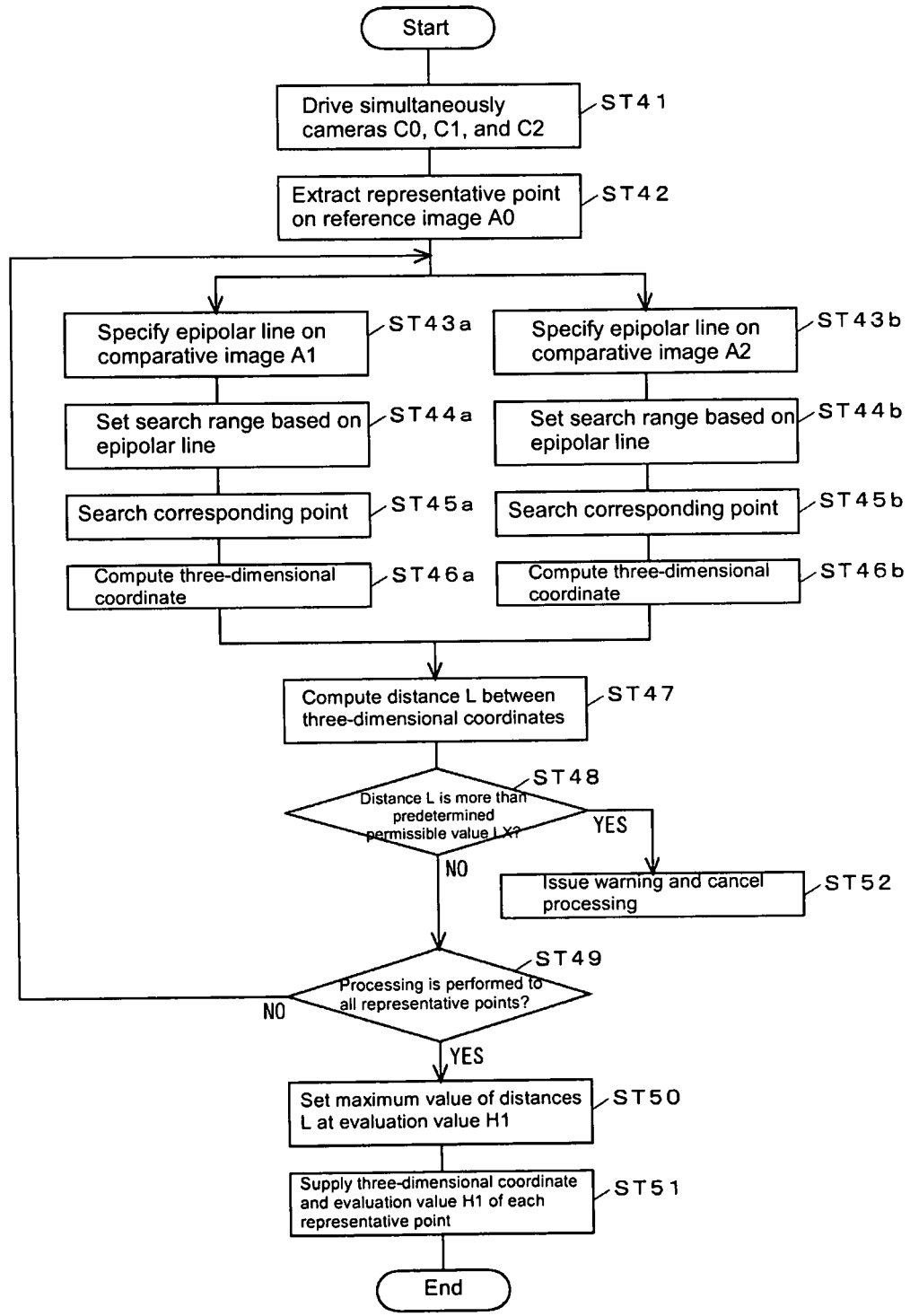
FIG. 8 shows a flowchart of still another example of the three-dimensional measurement processing.

FIG. 8 shows another example in the case where the three-dimensional measurement is performed using the cameras C0, C1, and C2.

In the example of FIG. 8, similarly to the example of FIG. 7, the cameras C1 and C2 are individually combined with the reference camera C0, and the three-dimensional coordinate computation processing is performed in each combination. However, a method for evaluating the accuracy of three-dimensional measurement differs from that of the example of FIG. 7.

Referring to FIG. 8, the cameras C0, C1, and C2 are simultaneously driven in ST41, and the representative point is extracted on the reference image A0 produced by the camera C0 in ST42. The two pieces of processing in ST41 and ST42 are identical to those in ST21 and 22 of FIG. 7.

Then, while attention is sequentially focused on the representative points, processing for specifying the epipolar line (ST43a and ST43b), processing for setting the search range (ST44a and ST44b), processing for searching the corresponding point (ST45a and ST45b), and processing for computing the three-dimensional coordinate (ST46a and ST46b) are performed in each comparative image. Because these pieces of processing are also similar to those of the example of FIG. 7, the detailed description is not given.

When the three-dimensional coordinate computation processing is ended, the flow goes to ST47, a distance L between the three-dimensional coordinate obtained from the set of images A0 and A1 and the three-dimensional coordinate obtained for the set of images A0 and A2 is computed. In ST48, the distance L is compared to a predetermined permissible value LX.

When the distance L is more than the predetermined permissible value LX, the flow goes to ST51, the warning output is performed, and the subsequent measurement is cancelled.

When the distance L is not more than the predetermined permissible value LX for any representative point, the affirmative determination is finally made in ST49, the flow goes to ST50, and the maximum value of the distances L is set to an evaluation value H1. In ST51, the three-dimensional coordinate of each representative point and the evaluation value H1 are supplied, and the processing is ended.

When the cameras C0, C1, and C2 are normally disposed, the three-dimensional coordinates obtained for the combinations of the cameras are infallibly matched with each other. In the example of FIG. 8, attention is focused on this point, and the processing is cancelled when a difference exceeding the permissible value LX is generated in the three-dimensional coordinate obtained in each combination of the cameras, so that the use of the measurement result having the poor accuracy can be prevented.

In the examples, the three-dimensional coordinate of each representative point is directly supplied as the three-dimensional measurement result. However, the output form is not limited to the examples. For example, when the edge constituting point of the measuring object is extracted as the representative point, a barycenter position of the object is obtained using the three-dimensional coordinate of each representative point, and the barycenter position may be supplied as the three-dimensional measurement result information. In the case where the apparatus is used for the purpose of inspection, the three-dimensional coordinate or the computation result in which the three-dimensional coordinate is used is matched with a predetermined value, and information on the matching result may be supplied.

In the examples, the pieces of numerical information H, h, and H1 are supplied as the evaluation information indicating the accuracy of three-dimensional measurement. Alternatively, the measurement accuracy may be expressed by plural levels. In such cases, the level indicating the measurement accuracy is obtained based on the finally-set evaluation value or the evaluation value computed in each measurement.

What is claimed is:

1. A three-dimensional measurement method in which a plurality of cameras are disposed while a positional relationship and optical axis directions are fixed such that visual fields of the cameras overlap within a predetermined range, one camera of the plurality of cameras is set as a reference camera, and three-dimensional measurement is performed to a measuring object by performing a first step, a second step, a third step, and a fourth step for predetermined times, the measuring object entering a range where visual fields of the plurality of cameras overlap being taken by the cameras in the first step, a plurality of representative points of the measuring object being extracted from a reference image produced by the reference camera in the second step, a plurality of points corresponding to the plurality of representative points on the reference image side being searched in an image produced by a camera except for the reference camera in the third step, a three-dimensional coordinate corresponding to a coordinate being obtained using the coordinate of each point correlated by the search of the third step in the fourth step, wherein, when three-dimensional measurement processing is performed to one measuring object, a plurality of shift amounts at the corresponding points obtained by the search of the third step to an epipolar line based on a predetermined relationship between the camera and the coordinate of the plurality of representative points in the reference image is computed for each of the plurality of representative points, evaluation information indicating accuracy of three-dimensional measurement result is set based on the computed shift amount, and the evaluation information is supplied along with the three-dimensional measurement result of the measuring object, wherein a first camera and a second camera of the plurality of cameras are individually driven in combination with the reference camera to obtain the three-dimensional coordinate and the computed shift amount corresponding to each combination, wherein a maximum value of the computed shift amount obtained from the combinations is set as an evaluation value and the three-dimensional coordinate having the smallest shift amount of the computed plurality of shift amounts corresponding to a same representative point is fixed as the three-dimensional measurement result, wherein a notification unit is configured to make a notification for warning when the evaluation value is greater than a predetermined reference value.

2. The three-dimensional measurement method according to claim 1, wherein the evaluation information includes data as to a measurement accuracy of the plurality of cameras from amongst a plurality of measurement accuracy levels.

3. A three-dimensional measurement apparatus comprising:

an image input unit into which an image of a measuring object entering a range where visual fields of a plurality of cameras overlap is individually fed from the plurality of cameras, the plurality of cameras being disposed while a positional relationship and optical axis directions are fixed such that the visual fields of the cameras overlap within a predetermined range;

a representative point extraction unit configured to extract a plurality of representative points of the measuring object from a reference image produced by a reference camera while one camera of the plurality of cameras is set as the reference camera;

a corresponding point search unit configured to search a plurality of points corresponding to the plurality of representative points on the reference image side in an image produced by a camera except for the reference camera;

a three-dimensional coordinate computation unit configured to obtain a three-dimensional coordinate corresponding to a coordinate using the coordinate of each point correlated by the search processing of the corresponding point search unit; and an output unit configured to supply three-dimensional measurement result information based on the three-dimensional coordinates computed for predetermined representative points extracted by the representative point extraction unit, wherein the three-dimensional measurement apparatus further comprises a shift amount computation unit configured to compute a plurality of shift amounts at the corresponding points obtained by the search of the corresponding point search unit to an epipolar line based on a predetermined relationship between the camera and the coordinate of each of the representative points in the reference image is computed for each of the representative points when three-dimensional measurement processing is performed to one measuring object, and the output unit is configured to set evaluation information indicating accuracy of three-dimensional measurement result based on the shift amounts computed by the shift amount computation unit and supplies the evaluation information along with the three-dimensional measurement result of the measuring object, wherein a first camera and a second camera of the plurality of cameras are individually driven in combination with the reference camera to obtain the three-dimensional coordinate and the computed shift amount corresponding to each combination, wherein a maximum value of the computed shift amount obtained from the combinations is set as an evaluation value and the three-dimensional coordinate having the smallest shift amount of the computed plurality of shift amounts corresponding to a same representative point is fixed as the three-dimensional measurement result, wherein a notification unit is configured to make a notification for warning when the evaluation value is greater than a predetermined reference value.

4. The three-dimensional measurement apparatus according to claim 3, wherein the evaluation information includes data as to a measurement accuracy of the plurality of cameras from amongst a plurality of measurement accuracy levels.

* * * * *